(12) United States Patent
Hung

(10) Patent No.: US 11,131,421 B2
(45) Date of Patent: Sep. 28, 2021

(54) ADJUSTABLE EXTENSION ARM DEVICE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD

( * ) Notice: Subject to any disclaimer, the term of this patent is extended or adjusted under 35 U.S.C. 154(b) by 234 days.

(21) Appl. No.: 16/521,786

(22) Filed: Jul. 25, 2019

(65) Prior Publication Data

US 2020/0049304 A1 Feb. 13, 2020

(30) Foreign Application Priority Data

Aug. 8, 2018 (TW) .................................. 107127544

(51) Int. Cl.
*F16M 11/04* (2006.01)
*F16M 11/08* (2006.01)
(Continued)

(52) U.S. Cl.
CPC ......... *F16M 11/048* (2013.01); *F16M 11/046* (2013.01); *F16M 11/08* (2013.01);
(Continued)

(58) Field of Classification Search
CPC .... F16M 11/048; F16M 11/24; F16M 11/046; F16M 11/06; F16M 11/08; F16M 11/10;
(Continued)

(56) References Cited

U.S. PATENT DOCUMENTS

| 5,743,503 | A | * | 4/1998 | Voeller | ................... | F16M 11/08 |
| | | | | | | 248/284.1 |
| 5,975,472 | A | * | 11/1999 | Hung | ................... | F16M 11/105 |
| | | | | | | 248/278.1 |

(Continued)

FOREIGN PATENT DOCUMENTS

| CN | 103629502 A | 3/2014 |
| TW | M548619 U | 9/2017 |

OTHER PUBLICATIONS

Search Report appended to an Office Action, which was issued to Chinese counterpart application No. 201811101809.8 by the CNIPA dated Dec. 17, 2020, with an English translation thereof.

*Primary Examiner* — Nkeisha Smith
(74) *Attorney, Agent, or Firm* — Husch Blackwell LLP

(57) ABSTRACT

An adjustable extension arm device includes an extension arm unit, a joint unit pivotally connected to the extension arm unit, an extension and retraction unit disposed in the extension arm unit, and an adjusting unit for adjusting the extension and retraction unit. A proximal endcap of the joint unit defines therein an accommodation chamber having a viewing opening. The adjusting unit has a driving carrier connected with the extension and retraction unit, and an adjusting threaded shaft rotatably mounted to the proximal endcap and threadedly engaged with the driving carrier to make a linear movement of the driving carrier relative to the viewing opening. A pointing unit is connected to and moved with the driving carrier to point out the load capacity of the extension and retraction unit during adjustment.

10 Claims, 8 Drawing Sheets

(51) Int. Cl.
*F16M 11/20* (2006.01)
*F16M 13/02* (2006.01)

(52) U.S. Cl.
CPC ..... *F16M 11/2014* (2013.01); *F16M 11/2021* (2013.01); *F16M 13/02* (2013.01); *F16M 2200/063* (2013.01)

(58) Field of Classification Search
CPC .......... F16M 11/2014; F16M 11/2021; F16M 13/02; F16M 13/022; F16M 2200/063
USPC ....... 248/122.1, 123.11, 123.2, 124.1, 125.2, 248/125.7, 162.1, 404, 405, 157
See application file for complete search history.

(56) References Cited

U.S. PATENT DOCUMENTS

| | | | |
|---|---|---|---|
| 6,012,693 A * | 1/2000 | Voeller | F16M 11/048 248/279.1 |
| 7,540,457 B2 * | 6/2009 | Oddsen, Jr. | F16M 11/105 248/278.1 |
| 8,366,060 B2 * | 2/2013 | Hung | F16M 11/041 248/124.1 |
| 8,960,632 B2 * | 2/2015 | Fallows | F16M 11/2092 248/575 |
| 9,228,696 B2 * | 1/2016 | Borloz | F16M 13/02 |
| 9,243,743 B2 * | 1/2016 | Hunter | F16M 11/048 |
| 10,738,940 B2 * | 8/2020 | Hung | F16M 11/048 |
| 10,969,057 B2 * | 4/2021 | Hung | F16M 11/24 |
| 10,976,001 B2 * | 4/2021 | Hung | F16M 13/022 |
| 2013/0009034 A1 * | 1/2013 | Fallows | F16M 11/2092 248/575 |
| 2015/0189991 A1 * | 7/2015 | Yang | F16M 13/022 248/292.12 |
| 2018/0372268 A1 * | 12/2018 | Hung | F16M 13/022 |
| 2020/0355320 A1 * | 11/2020 | Hung | F16M 13/022 |

* cited by examiner

ADJUSTABLE EXTENSION ARM DEVICE

CROSS-REFERENCE TO RELATED APPLICATION

This application claims priority of Taiwanese Patent Application No. 107127544, filed on Aug. 8, 2018.

FIELD

The disclosure relates to an extension arm device, and more particularly to an adjustable extension arm device allowing a user device mounted thereon to be adjusted to a desired location.

BACKGROUND

A conventional extension arm device for supporting a user device (such as a flat panel display), as disclosed in German Patent Registration No. 202017107086, includes upper and lower channels, a proximal endcap pivotally connected to proximal ends of the upper and lower channels, a distal endcap pivotally connected to distal ends of the upper and lower channels to form a four-linkage mechanism, a gas spring disposed between the upper and lower channels to permit the extension arm device to be adjusted, an adjusting threaded shaft rotatably disposed on the proximal endcap, and a clevis threadedly engaged with the adjusting threaded shaft to make a linear movement along with rotation of the shaft. Upon rotation of the adjusting threaded shaft by a user, the clevis is axially moved to vary the angular position of the gas spring relative to the upper channel so as to adjust a load capacity of the gas spring.

However, the clevis is concealed in the proximal endcap so that it is difficult for the user to observe the position of the clevis and the current load capacity of the gas spring, which renders the adjusting operation inconvenient.

SUMMARY

Therefore, an object of the disclosure is to provide an adjustable extension arm device that can alleviate at least one of the drawbacks of the prior art.

According to the disclosure, the adjustable extension arm device includes an extension arm unit, a joint unit, an extension and retraction unit, an adjusting unit and a pointing unit. The extension arm unit includes a first arm segment and a second arm segment which is coupled with the first arm segment to cooperatively define a channel therebetween. Each of the first and second arm segments has proximal and distal ends. The joint unit includes a proximal endcap which is pivotally connected with the proximal ends of the first and second arm segments, and a distal endcap which is pivotally connected with the distal ends of the first and second arm segments. The proximal endcap defines therein an accommodation chamber which extends in an axial direction to terminate at an access opening that faces the channel and a viewing opening that faces away from the channel. The extension and retraction unit is disposed in the channel, and has a stationary portion which is pivotally connected to the first arm segment, and a movable portion which is pivotally connected to the second arm segment and extendable and retractable relative to the stationary portion. The adjusting unit includes an adjusting threaded shaft which is rotatably mounted to the proximal endcap, and a driving carrier which is disposed in the accommodation chamber, connected with the movable portion of the extension and retraction unit, and threadedly engaged with the adjusting threaded shaft to make a linear movement along with the rotation of the adjusting threaded shaft relative to the viewing opening between an upper position, where the driving carrier is proximal to the first arm segment, and a lower position, where the driving carrier is proximal to the second arm segment. The pointing unit has a connected end which is disposed adjacent to the access opening and connected to the driving carrier, and extends from the connected end along an axis in the axial direction to have a pointing end that is disposed adjacent to the viewing opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
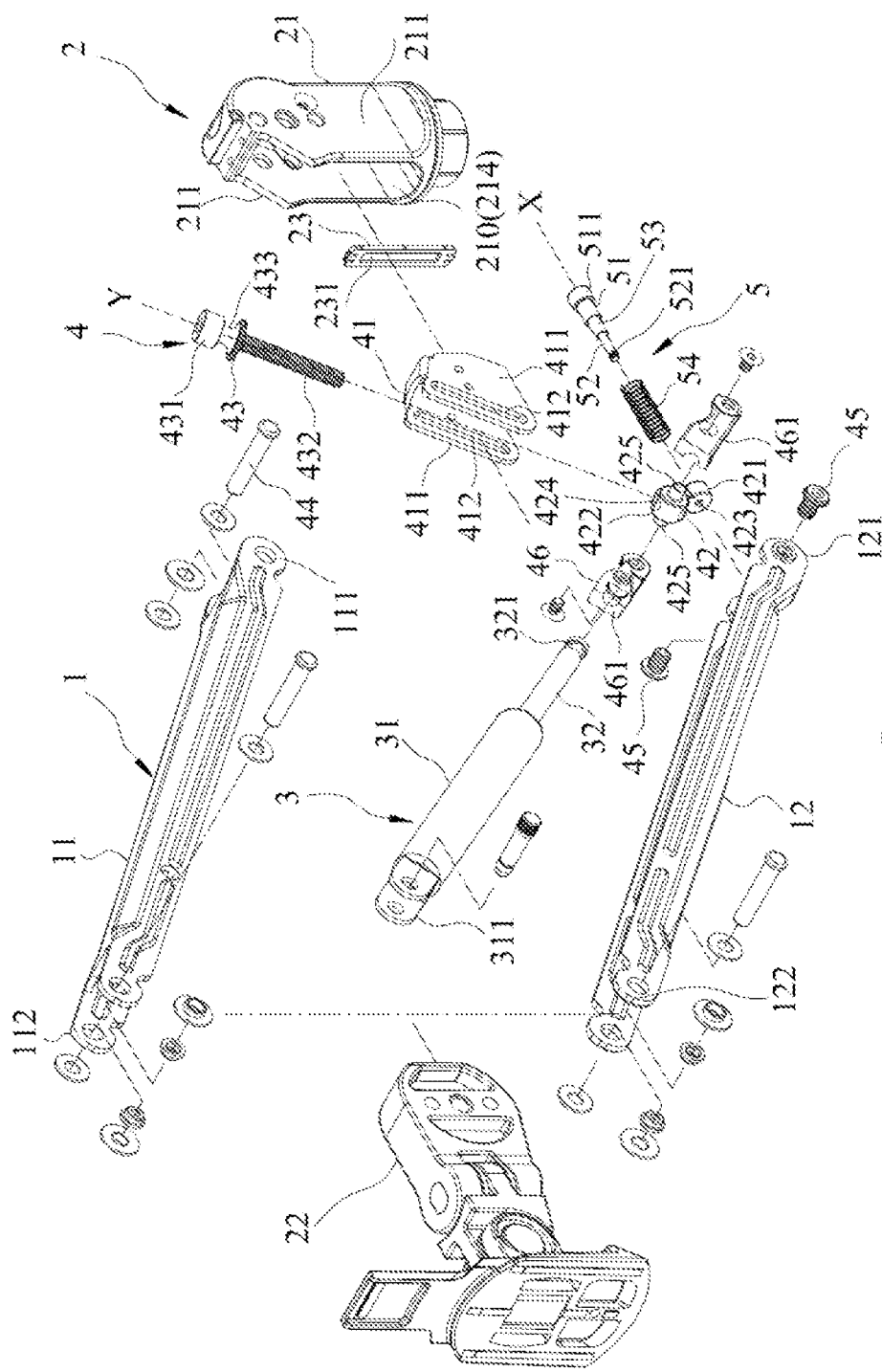
FIG. 1 is an exploded perspective view illustrating an embodiment of an adjustable extension arm device according to the disclosure.
Figure 2:
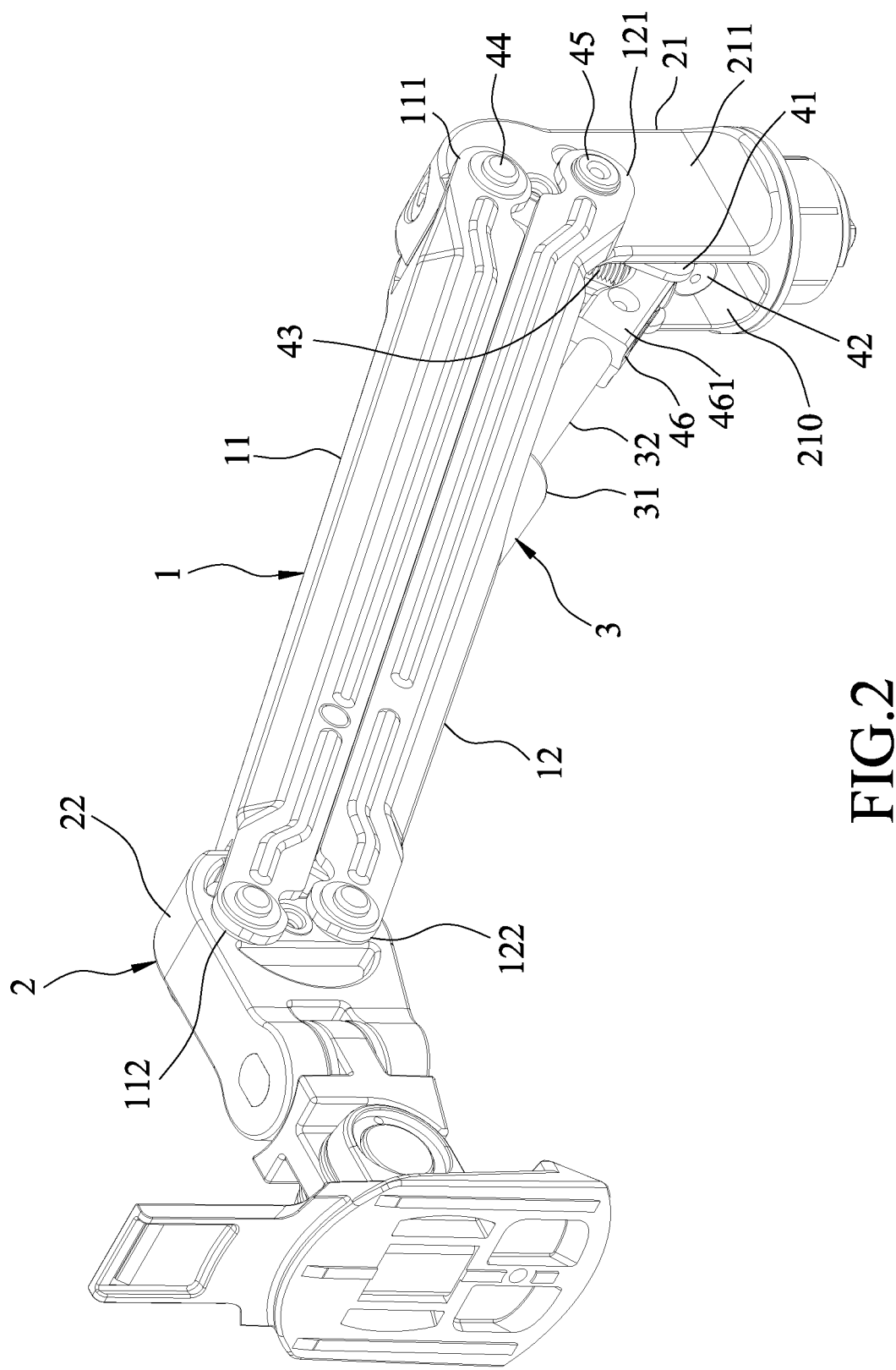
FIG. 2 is a perspective view of the embodiment.
Figure 3:
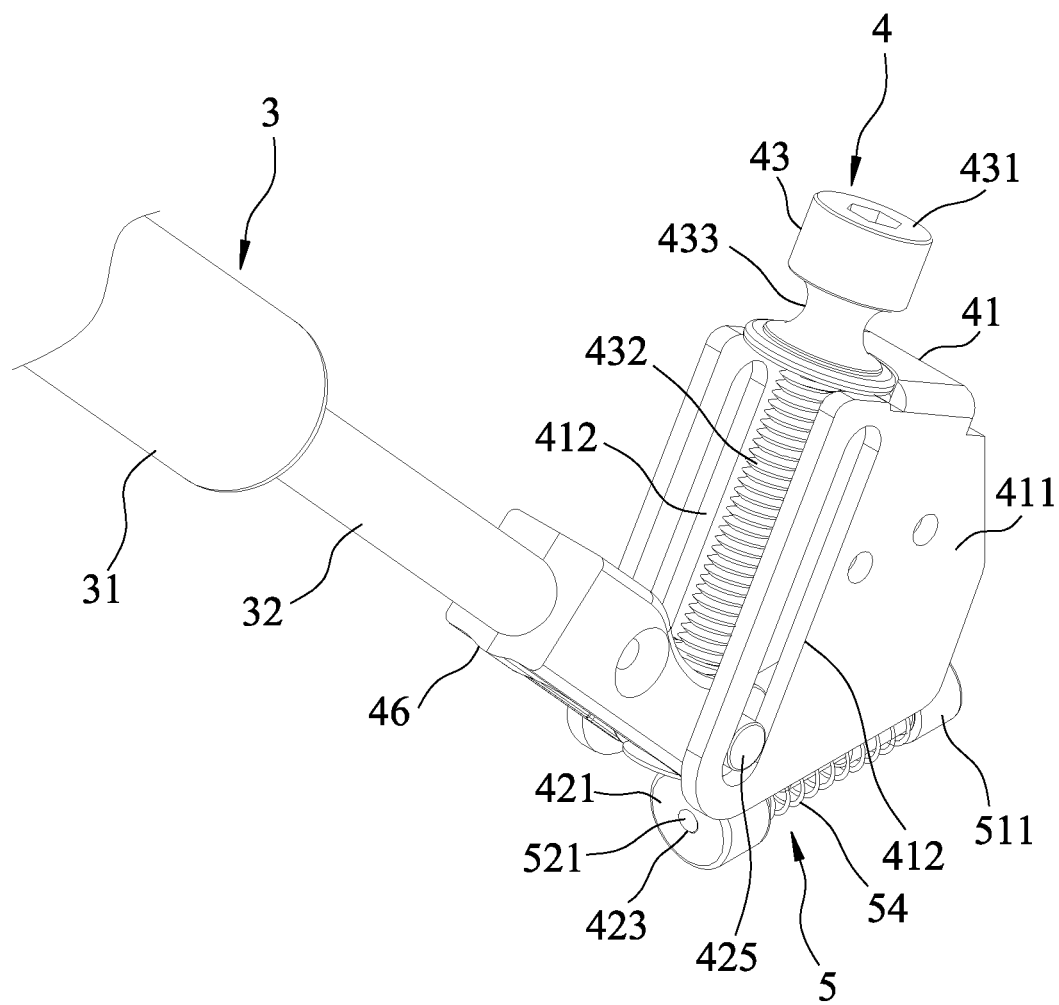
FIG. 3 is fragmentary perspective view illustrating a driving carrier and a guiding seat of the embodiment.
Figure 4:
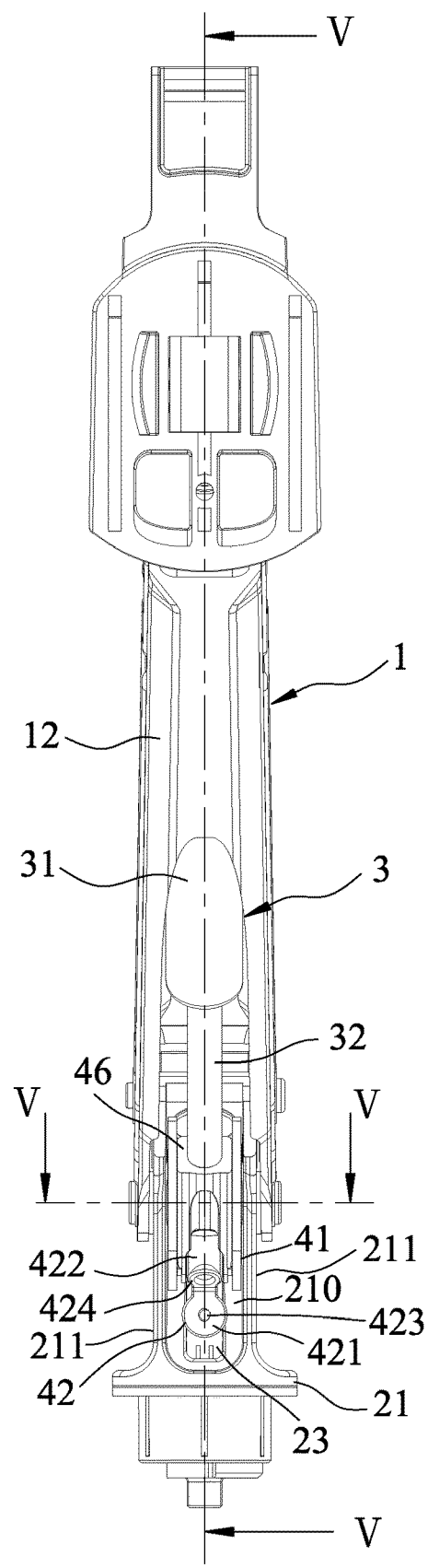
FIG. 4 is a side view of the embodiment.
Figure 5:
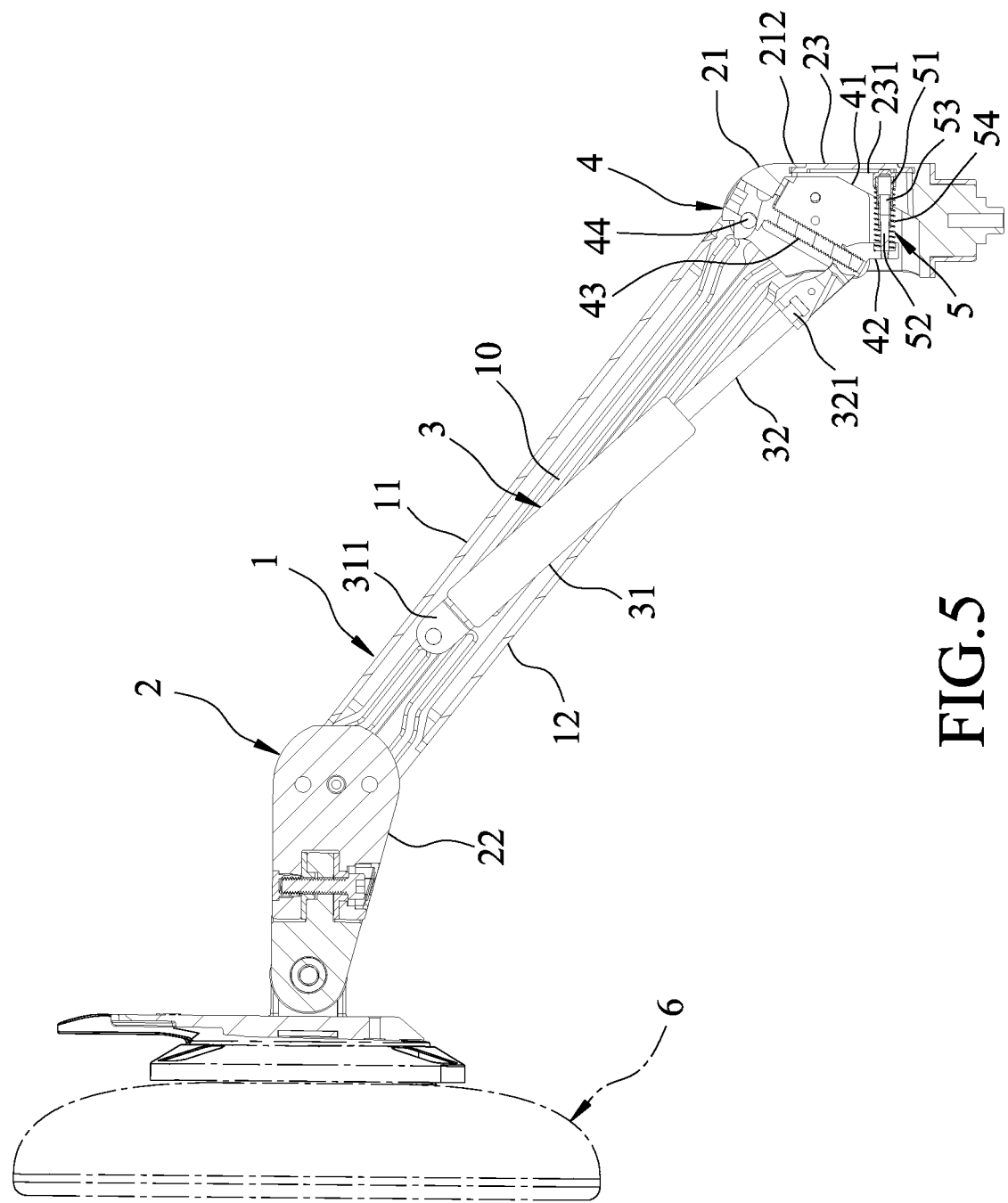
FIG. 5 is a sectional view taken along line V-V of FIG. 4.
Figure 6:
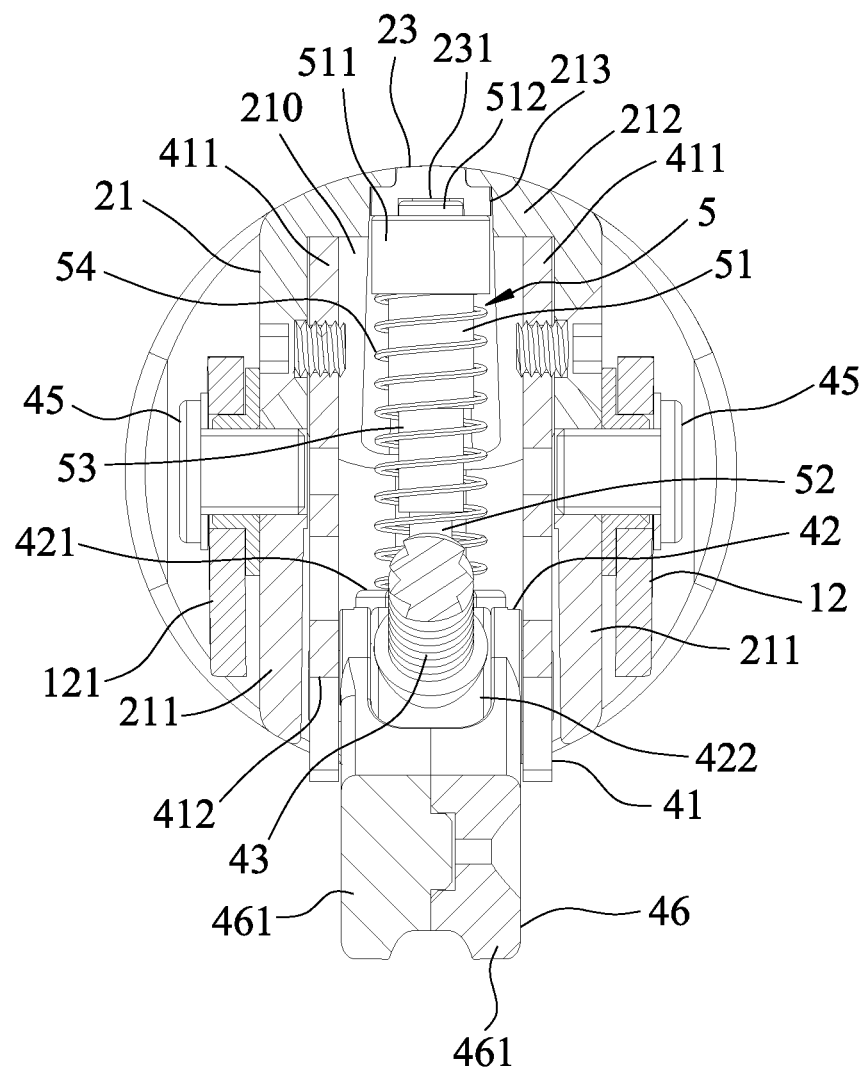
FIG. 6 is a sectional view taken along line VI-VI of FIG. 4.

Referring to FIGS. 1 to 3, an embodiment of an adjustable extension arm device according to the disclosure includes an extension arm unit 1, a joint unit 2, an extension and retraction unit 3, an adjusting unit 4 and a pointing unit 5.

With reference to FIGS. 1, 2, 4 and 5, the extension arm unit 1 includes a first arm segment 11 and a second arm segment 12 which is coupled with the first arm segment 11 to cooperatively define a channel 10 therebetween. Each of the first and second arm segments 11, 12 has proximal and distal ends 111, 112; 121, 122.

The joint unit 2 includes a proximal endcap 21, a distal endcap 22 and a light-translucent panel 23. The proximal endcap 21 is pivotally connected with the proximal ends 111, 121 of the first and second arm segments 11, 12, and has two cap walls 211 spaced apart from each other, and a side wall 212 interconnecting the cap walls 211 to cooperatively define an accommodation chamber 210 thereamong. The accommodation chamber 210 extends in an axial direction to terminate at an access opening 214 that is opposite to the side wall 212. The side wall 212 has a viewing opening 213 formed therethrough and in spatial communication with the accommodation chamber 210. The distal endcap 22 is pivotally connected with the distal ends 112, 122 of the first and second arm segments 11, 12 such that the proximal and distal endcaps 21, 22 and the first and second arm segments 11, 12 are cooperatively formed as a four-linkage mechanism. The panel 23 is disposed to cover the viewing opening 213, and has a groove 231 which extends in an upright direction.

The extension and retraction unit 3 is disposed in the channel 10, and includes a hydraulic cylinder 31 and a piston 32 movably disposed in the hydraulic cylinder 31. The hydraulic cylinder 31 has a stationary portion 311 at one end thereof. The stationary portion 311 is pivotally connected to the first arm segment 11 and adjacent to the distal end 112. The piston 32 has a movable portion 321 at one end thereof. The movable portion 321 is pivotally connected to the second arm segment 12 and adjacent to the proximal end 121 to be extendable and retractable relative to the stationary portion 311.

With reference to FIGS. 3 to 6, the adjusting unit 4 includes a guiding seat 41 mounted in the accommodation chamber 210, an adjusting threaded shaft 43, a driving carrier 42, a first pivot pin 44, two second pivot pins 45 and a connecting member 46.

The guiding seat 41 has two rail walls 411 spaced apart from each other. Each rail wall 411 has a guiding rail 412 extending in a carrier moving direction (Y). In this embodiment, the guiding rail 412 is an elongated groove extending through the rail wall 411.

The driving carrier 42 is disposed in the accommodation chamber 210, and has a lower seat 421 disposed opposite to the viewing opening 213 along an axis (X) and having a fastening hole 423 which extends through the lower seat 421 along the axis (X), and an upper seat 422 disposed between the rail walls 411. The upper seat 422 has a threaded hole 424 extending in the carrier moving direction (Y) for threadedly engaging with the adjusting threaded shaft 43, and two guiding portions 425 disposed at two opposite sides of the upper seat 422. In this embodiment, the guiding portions 425 are each in the form of a protrusion, and are respectively slidably engaged with the guiding rails 412. The axis (X) intersects the carrier moving direction (Y) by an included angle (θ) not more than 90 degrees, such as 60 degrees. The axis (X) is perpendicular to the upright direction in which the groove 231 extends.

Figure 7:
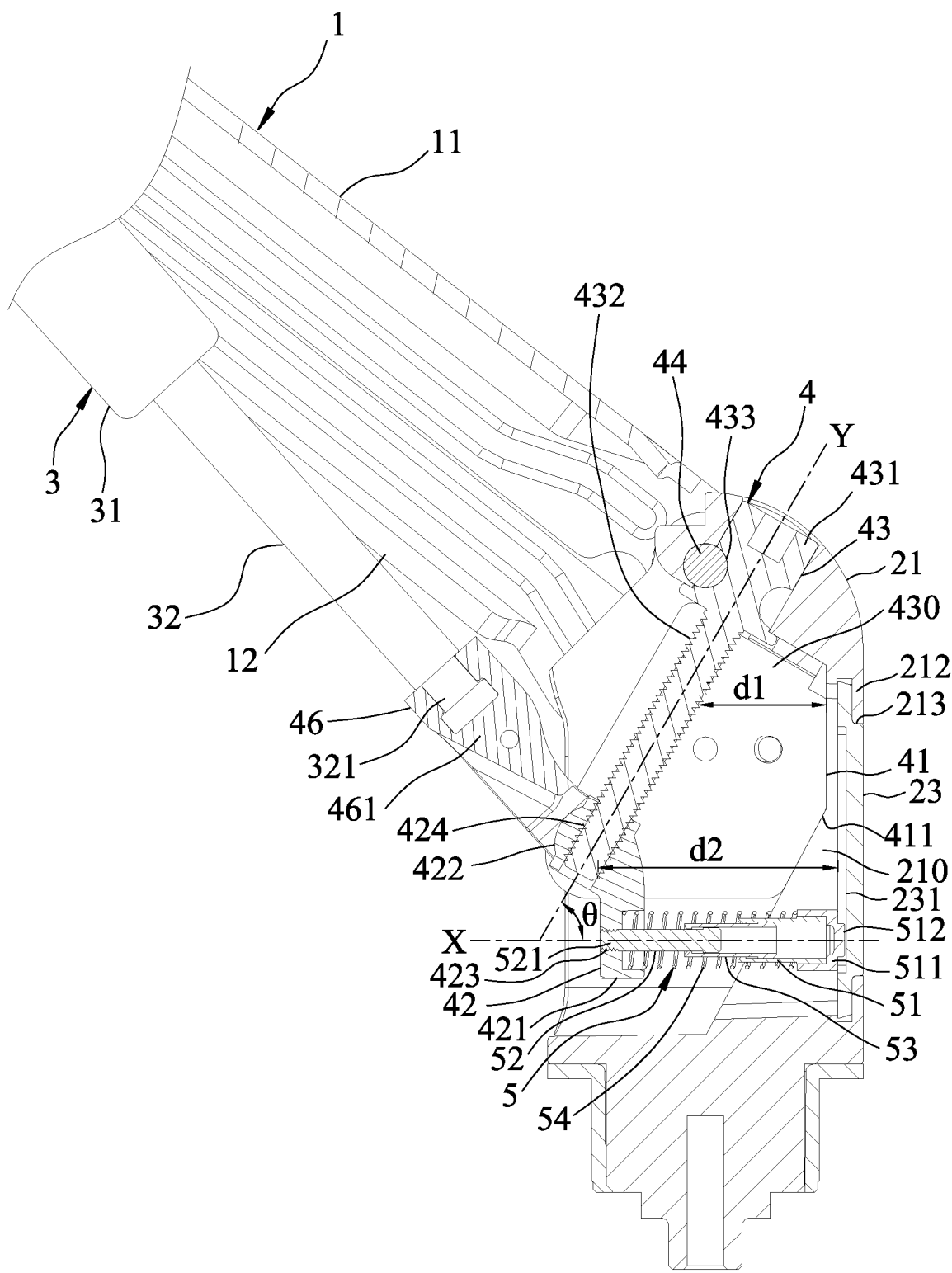
FIG. 7 is a fragmentary, enlarged, sectional view illustrating the state when the driving carrier is in a lower position.

The adjusting threaded shaft 43 extends in the accommodation chamber 210 along a center line in the carrier moving direction (Y), and is rotatably mounted to the proximal endcap 21 about the center line. With reference to FIG. 7, the adjusting threaded shaft 43 is spaced apart from the side wall 212 by a width-varying clearance 430. The clearance 430 has a first width (d1) adjacent to the first arm segment 11 and a second width (d2) adjacent to the second arm segment 12 and larger than the first width (d1). The adjusting threaded shaft 43 has an enlarged head 431 and a threaded shank 432 which extends from the enlarged head 431 along the center line to define a movement restricted recess 433 therebetween. The threaded shank 432 is threadedly engaged in the threaded hole 424 of the driving carrier 42 so as to make a linear movement of the driving carrier 42 in the carrier moving direction (Y) along with the rotation of the adjusting threaded shaft 43. The driving carrier 42 is movable relative to the viewing opening 213 between an upper position (see FIG. 8), where the driving carrier 42 is proximal to the first arm segment 11, and a lower position (see FIG. 7), where the driving carrier 42 is proximal to the second arm segment 12.

Specifically, the first pivot pin 44 extends through the proximal end 111 of the first arm segment 11, the proximal endcap 21 and the movement restricted recess 433 of the adjusting threaded shaft 43 so that the first arm segment 11 is journalled to the proximal endcap 21, and so that a linear movement of the adjusting threaded shaft 43 is restricted during the rotation thereof.

Each of the second pivot pins 45 extends through the proximal end 121 of the second arm segment 12 and the proximal endcap 21 so that the second arm segment 12 is journalled to the proximal endcap 21.

The connecting member 46 has two shell halves 461 matingly engaged with each other to receive the upper seat 422 of the driving carrier 42 and the movable portion 321 of the piston 32 so as to securely connect the driving carrier 42 to the movable portion 321.

The pointing unit 5 extends along the axis (X) between the panel 23 and the lower seat 421 of the driving carrier 42, and has first, middle and second rod segments 52, 53, 51 telescopically fitted to one another, and a biasing member 54. The first rod segment 52 has a connected end 521 securely connected to the fastening hole 423 of the driving carrier 42. The second rod segment 51 has an enlarged pointing end 511 and a protrusion 512 which extends from the pointing end 511 and is slidably engaged in the groove 231 of the panel 23. The middle rod segment 53 is disposed between the first and second rod segments 52, 51. The biasing member 54 is sleeved around the rod segments 52, 53, 51 and abuts against the lower seat 421 of the driving carrier 42 and the pointing end 511 so as to bias the rod segments 52, 53, 51 toward the panel 23. In this embodiment, the fastening hole 423 is in the form of a screw hole, and the connected end 521 is formed as a screw bolt threadedly engaged in the fastening hole 423. Alternatively, the fastening hole 423 may be of a recess, and the connected end 521 is of a protrusion matingly fitted in the recess.

Figure 8:
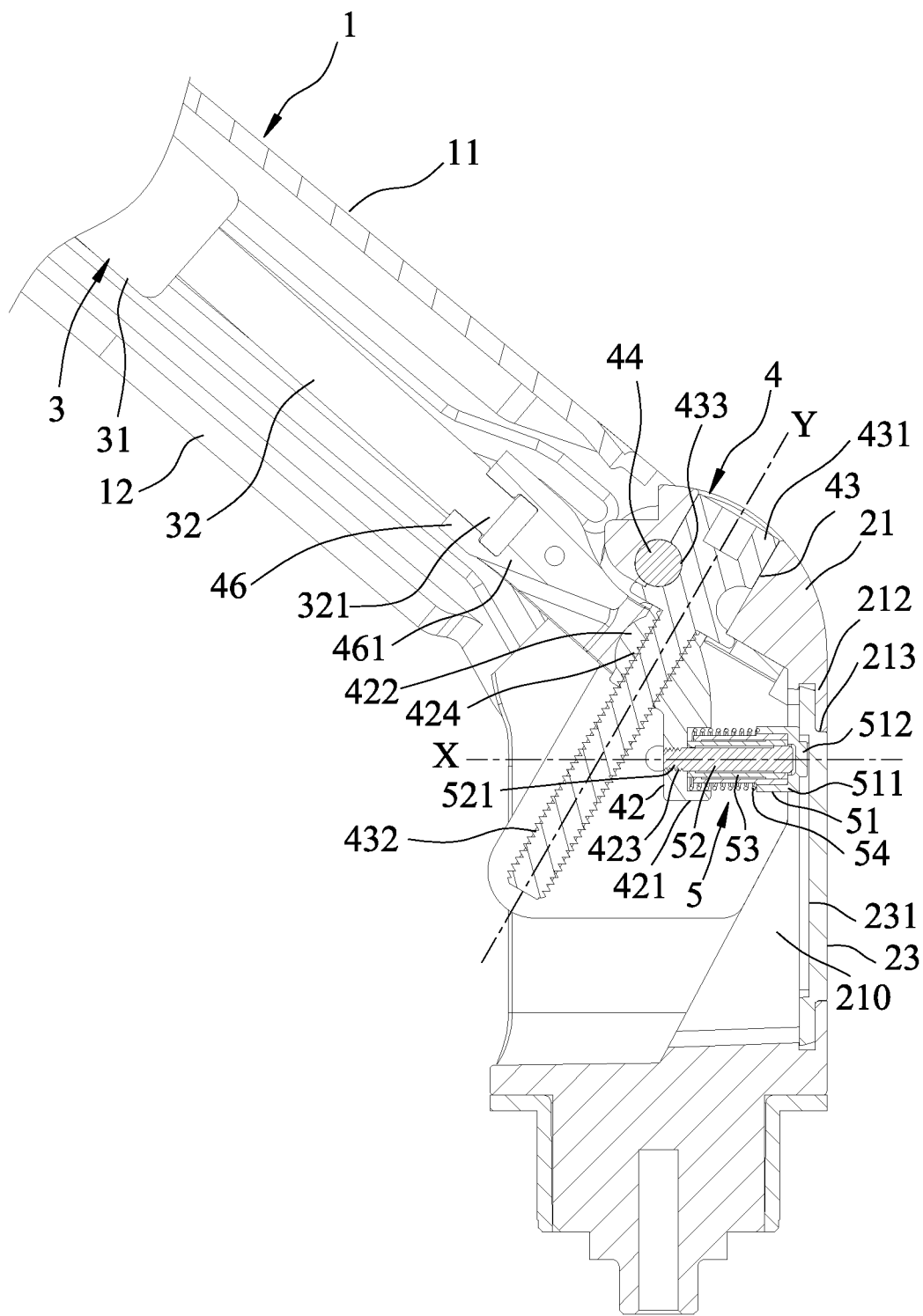
FIG. 8 is a view similar to FIG. 7, illustrating the state when the driving carrier is in an upper position.

With reference to FIGS. 3, 5, 6 to 8, the adjustable extension arm device of the present disclosure is adapted for supporting a user device 6 (such as a display screen). When it is desired to adjust the load capacity of the extension and retraction unit 3, upon rotation of the adjusting threaded shaft 43 by a user, the driving carrier 42 is moved linearly, with the guiding of the guiding portions 425 and the guiding rails 412, between the upper and lower positions. Thus, when the driving carrier 42 is in the lower position as shown in FIG. 7, the piston 32 is extended. When the driving carrier 42 is in the upper position as shown in FIG. 8, the piston 32 is retracted. The hydraulic fluid hence can be varied so as to adjust the load capacity of the extension and retraction unit 3.

During such movement, the pointing unit 5 is moved along with the driving carrier 42 along the axis (X) through the guiding engagement of the protrusion 512 in the groove 231. With the width-varying clearance 411, the rod segments 52, 53, 51 can be extended and retracted during the movement to keep the pointing end 511 in proximity of the panel 23 by means of a biasing action of the biasing member 54 so as to be clearly viewed by the user from the panel 23 to point out the current load capacity of the extension and retraction unit 3.

As illustrated, with the light-translucent panel 23 disposed to cover the viewing opening 213 in the proximal endcap 21, the load capacity of the extension and retraction unit 3 can be pointed out clearly so as to render the adjustment operation convenient. Moreover, the viewing opening 213 is formed in the side wall 212 of the proximal endcap 21 without adversely affecting the structural strength of the proximal endcap 21.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An adjustable extension arm device comprising:
an extension arm unit including a first arm segment and a second arm segment which is coupled with said first arm segment to cooperatively define a channel therebetween, each of said first and second arm segments having proximal and distal ends;
a joint unit including a proximal endcap which is pivotally connected with said proximal ends of said first and second arm segments, and a distal endcap which is pivotally connected with said distal ends of said first and second arm segments, said proximal endcap defining therein an accommodation chamber which extends in an axial direction to terminate at an access opening that faces said channel and a viewing opening that faces away from said channel;
an extension and retraction unit disposed in said channel, and having a stationary portion which is pivotally connected to said first arm segment, and a movable portion which is pivotally connected to said second arm segment and extendable and retractable relative to said stationary portion;
an adjusting unit including an adjusting threaded shaft which is rotatably mounted to said proximal endcap, and a driving carrier which is disposed in said accommodation chamber, connected with said movable portion of said extension and retraction unit, and threadedly engaged with said adjusting threaded shaft to make a linear movement along with the rotation of said adjusting threaded shaft relative to said viewing opening between an upper position, where said driving carrier is proximal to said first arm segment, and a lower position, where said driving carrier is proximal to said second arm segment; and
a pointing unit having a connected end which is disposed adjacent to said access opening and connected to said driving carrier, and extending from said connected end along an axis in the axial direction to have a pointing end that is disposed adjacent to said viewing opening.

2. The adjustable extension arm device as claimed in claim 1, wherein said joint unit includes a light-translucent panel disposed to cover said viewing opening.

3. The adjustable extension arm device as claimed in claim 2, wherein said adjusting unit includes a guiding seat mounted in said accommodation chamber and having two guiding rails each of which extends in a carrier moving direction, the axis intersecting the carrier moving direction by an included angle not more than 90 degrees, said driving carrier being disposed between said guiding rails, and having two guided portions which are respectively slidably engaged with said guiding rails to make the linear movement in the carrier moving direction.

4. The adjustable extension arm device as claimed in claim 3, wherein said adjusting unit includes a first pivot pin on which said proximal end of said first arm segment is journalled to said proximal endcap, and two second pivot pins on which said proximal end of said second arm segment is journalled to said proximal endcap, said adjusting threaded shaft having an enlarged head and a threaded shank which extends from said enlarged head in the carrier moving direction to define therebetween a movement restricted recess that permits insertion of said first pivot pin so as to restrict a linear movement of said adjusting threaded shaft during the rotation thereof.

5. The adjustable extension arm device as claimed in claim 3, wherein said proximal endcap has two cap walls spaced apart from each other, and a side wall interconnecting said cap walls to cooperatively define said accommodation chamber thereamong, said viewing opening being formed in said side wall, said adjusting threaded shaft extending in said accommodation chamber and being spaced apart from said side wall by a clearance, said clearance having a first width adjacent to said first arm segment and a second width adjacent to said second arm segment and larger than the first width.

6. The adjustable extension arm device as claimed in claim 5, wherein said pointing unit has a first rod segment which has said connected end connected to said driving carrier, and a second rod segment which has said pointing end and telescopically fitted to said first rod segment.

7. The adjustable extension arm device as claimed in claim 6, wherein said panel has a groove which extends in an upright direction perpendicular to the axis, said second rod segment having a protrusion which extends from said pointing end and is slidably engaged in said groove.

8. The adjustable extension arm device as claimed in claim 7, wherein said pointing unit has a biasing member which is sleeved around said first and second rod segments and abuts against said driving carrier and said pointing end so as to bias said first and second rod segments toward said panel.

9. The adjustable extension arm device as claimed in claim 3, wherein said driving carrier has a lower seat disposed opposite to said viewing opening along the axis and having a fastening hole for connection with said connected end of said pointing unit, and an upper seat having a threaded hole for threadedly engaging with said adjusting threaded shaft, and said guiding portions disposed at two opposite sides of said upper seat.

10. The adjustable extension arm device as claimed in claim 9, wherein said extension and retraction unit includes a hydraulic cylinder having said stationary portion at one end thereof, and a piston movably disposed in said hydraulic cylinder and having said movable portion at one end thereof, said adjusting unit including a connecting member which has two shell halves matingly engaged with each other to receive said upper seat and said movable portion so as to connect said driving carrier to said movable portion.

* * * * *